United States Patent [19]
Tamura et al.

[11] Patent Number: 5,323,367
[45] Date of Patent: Jun. 21, 1994

[54] REPRODUCTION OR RECORDING DEVICE HAVING A PAUSE FUNCTION

[75] Inventors: Yutaka Tamura; Nagatoshi Sugihara, both of Gifu; Masato Fuma, Aichi; Takao Inoue, Chiba; Miyuki Okamoto, Gifu, all of Japan

[73] Assignee: Sanyo Electric Co., Ltd., Japan

[21] Appl. No.: 964,787

[22] Filed: Oct. 22, 1992

[30] Foreign Application Priority Data

Oct. 25, 1991 [JP] Japan .................... 3-279094
Mar. 25, 1992 [JP] Japan .................... 4-067261

[51] Int. Cl.$^5$ .............................. G11B 17/22
[52] U.S. Cl. ........................ 369/32; 369/58; 369/44.29
[58] Field of Search ............... 369/32, 30, 33, 58, 369/59, 47-50, 56, 43, 275.3, 44.26, 44.27, 44.28, 44.29; 360/72.1, 75, 78.04, 32, 36.2, 64

[56] References Cited

U.S. PATENT DOCUMENTS 5,153,861 10/1992 Maeda et al. ................ 369/32

OTHER PUBLICATIONS

Murata et al., "Multimedia Type Digital Audio Disc System", IEEE *Transactions on Consumer Electronics*, vol. 35, No. 3, pp. 544-551, Aug. 1989.
Torazawa et al., "Erasable Digital Audio Disk System", *Applied Optics*, vol. 25, No., 22, pp. 3990-3995, Nov. 15, 1986.

Primary Examiner—Robert J. Pascal
Assistant Examiner—Ali Neyzari
Attorney, Agent, or Firm—Peter L. Michaelson

[57] ABSTRACT

A disc recorder containing a compressed data memory for storing compressed audio data to be recorded to a disc or reproduced from a disc. When a reduction pause state is set during reproduction operation, reading out of data from a compressed data memory is limited. Therefore, discontinuity of reproduced audio at the time of pause cancellation is prevented. When a recording pause state is set during recording operation, the compressed data memory is made empty. Therefore, discontinuity of the recording audio is also prevented at the time of pause cancellation.

9 Claims, 10 Drawing Sheets

FIG.2
PRIOR ART
AUDIO DATA A
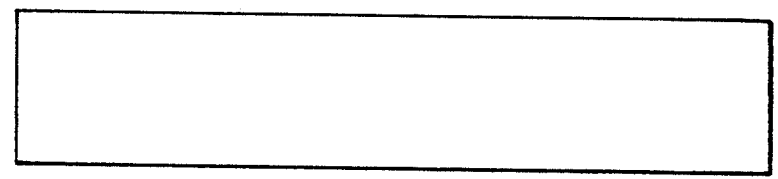
COMPRESSED AUDIO DATA B
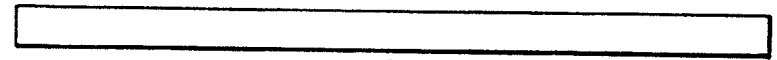
TIME BASE COMPRESSED AUDIO DATA C
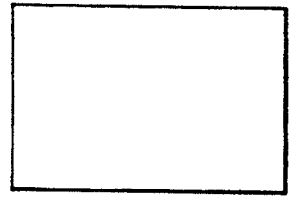
INTERMITTENT DATA D
GAP DATA → 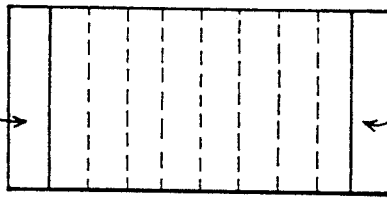 ← GAP DATA
EFM DATA E
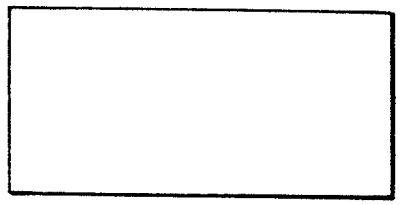

REPRODUCTION OR RECORDING DEVICE HAVING A PAUSE FUNCTION

BACKGROUND OF THE INVENTION

1. Field of the Invention

The present invention relates to a reproduction or recording device, and more particularly, to a reproduction or recording device in which a pause state can be set and canceled during reproduction or recording of audio data using onto a disc-type recording medium using an optical recording system or a magneto-optical recording system.

2. Description of the Background Art

A special device for reproducing digital audio data from a disc having digital audio data recorded by an optical reproduction system (referred to as a "disc player" hereinafter) is proposed, wherein continuous reproduction of digital audio data can be carried out by sequentially storing into a memory digital, audio data continuously read out from a disc, and sequentially reading out the stored data from the memory. As a result of employing such a reproduction method, it is expected that continuous reproduced audio data can be obtained by continuously reading out in sequence audio data stored in the memory once, and rapidly supplying data to the memory by driving the disc at a high speed for a predetermined time period after the pickup is restored to the original track position to read out audio data, even the in case where there is a tracking error the pickup due to vibration during reproduction that results in a drop in the audio data read out from the disc A disc player employing such technique is disclosed in Japanese Patent Laying-Open No. 3-3165, for example.

It is to be noted that there is no teaching in the document of the prior art of providing means for setting and canceling a pause state during reproduction in a disc player employing the above-described technique. However, there is a possibility of a drop in the reproduced sound when a pause state is canceled in the case where a pause state is set during the reproduction operation to interrupt provision of reproduced sound in the above-described disc player.

Although the pickup enters a reproduction standby state once a pause state is set to interrupt read out of audio data from the disc, there is a possibility of a tracking failure by the pickup when the pause state is canceled, so that the supply of reproduced audio data to the memory cannot be restarted In such a case, audio data is read out continuously from the memory even when the pickup is trying an access of the reproduction track position. Therefore, if the amount of remaining data stored in the memory is not sufficient at the time of canceling the pause state, the memory may become empty during the time period the pickup tries to access the track to result in discontinuity in the reproduced sound.

A device has been proposed recently that records intermittently compressed audio data on a disc using the magneto-optical recording principle (referred to as a "disc recorder" hereinafter). Because this disc recorder carries out intermittent recording on a magneto-optical disc with audio data of approximately two seconds for each channel provided from an audio signal source that is compressed into approximately 0.4 seconds as one recording unit (1 cluster), it is necessary to provide a memory that can temporarily store compressed data for recording of at least 1 cluster. By providing a memory of sufficient capacity, re-recording can be made possible even when tracking error of a pickup occurs due to vibration during recording.

However, such a provision of means for setting and canceling a pause state during recording operation in such a disc recorder will cause problems as set forth in the following. When a pause state is set during recording, there is a problem of the audio data already stored in the memory prior to the setting of pause not being recorded on a disc if the intermittent recording operation from the memory to the disc is ceased merely in response to the pause state setting.

Although the pickup enters a record standby state to interrupt recording of audio data to a disc when a pause state is set, there is a possibility of tracking failure by the pickup at the time of canceling the pause state so that recording of audio data to the disc cannot be restarted. Because the audio data for recording from an audio signal source is continuously provided to the memory even during the time period when the pickup is attempting to access the recording track position, there is a possibility of the memory becoming full during a failure of the pickup in accessing the track if the amount of the data stored in the memory is great at the time of canceling the pause state. Such a situation results in discontinuity in the recording sound.

SUMMARY OF THE INVENTION

An object of the present invention is to provide a disc reproduction device that does not make the reproduced sound discontinuous at the time of canceling a pause state even when a pause state is set during reproduction operation.

Another object of the present invention is to provide a disc recording device that does not make the recorded sound discontinuous at the time of canceling a pause state even when a pause state is set during recording operation.

A further object of the present invention is to provide a disc recording and reproduction device that responds rapidly to a cancellation of a pause state set during recording or reproduction operation for restarting recording or reproduction operation.

In summary, the present invention is a reproduction device that records compressed audio data onto a disc, including a reproduction head for reproducing compressed audio data from the disc, a memory for holding audio data, a write control circuit for writing audio data reproduced by the reproduction head intermittently into the memory at a high speed, a read out control circuit for reading out audio data from the memory continuously at a low speed, a circuit for converting audio data read out from the memory into an audio signal to provide the same, an intermittent reproduction control circuit for driving the reproduction head and the write control circuit for supplying reproduced audio data to the memory when detection is made of an empty area exceeding a predetermined amount in the memory, a pause switch for setting and canceling a reproduction pause state of the disc, and a read out restricting circuit responsive to a setting of a reproduction pause state by the pause switch for stopping read out of audio data from the memory.

According to another aspect of the present invention, a recording device for writing compressed audio data into a disc, includes: a data compressing circuit for data-compressing audio data supplied from an audio signal source; a memory for holding compressed audio data; a write control circuit for writing audio data which is data-compressed by the data compressing circuit sequentially into memory; a read out control circuit for reading out audio data from the memory as compressed data at high speed in a predetermined recording unit; a recording head for recording compressed audio data read out from the memory into disc; an intermittent recording control circuit for driving the read out control circuit and the recording head for reading out to recording head the audio data from the memory for recording, when detection is made that audio data exceeding the predetermined recording unit is stored in the memory; a pause switch for setting and canceling a recording pause state of the disc; and a write restricting circuit in response to a setting of a recording pause state by the pause switch for reading out to recording head the audio data of the recording unit being recorded at the time of setting of a recording pause state and for stopping writing the audio data of a succeeding recording unit into the memory.

According to a further aspect of the present invention, a recording/reproduction device for recording compressed audio data into a disc and for reproducing the same from the disc, includes: a recording/reproduction head for recording and reproducing the audio data to and from the disc; a circuit for data-compressing audio data supplied from an audio signal source at the time of recording, and for data-expanding the audio data reproduced from the disc at the time of reproduction; a memory for holding audio data; a write control circuit for writing the audio data which is data-compressed by the data compressing circuit sequentially into the memory at the time of recording, and for writing the audio data reproduced by the head intermittently at a high speed into the memory at the time of reproduction; a read out control circuit for reading out at high speed in a predetermined recording unit the audio data from the memory as compressed data at the time of recording, and for reading out continuously at a low speed the audio data from the memory at the time of reproduction; an intermittent recording control circuit for driving the read out control circuit and the recording head and for reading out audio data to the recording head from the memory for recording, when detection is made of a storage of audio data exceeding the predetermined recording unit in the memory at the time of recording; an intermittent reproduction control circuit for driving the reproduction head and the write control circuit and for supplying reproduced audio data to the memory, when detection is made of an empty area exceeding a predetermined amount in the memory at the time of reproduction; a pause switch for setting and canceling a pause state of the disc; a write restricting circuit responsive to a setting of a recording pause state by the pause switch to read out to the recording head the audio data of the recording unit being recorded at the time of a setting of a record pause state and for stopping the writing of the audio data of a succeeding recording unit to the memory; and a read out restricting circuit in responsive to a setting of a reproduction pause state by the pause switch to stop the read out of audio data from the memory at the time of reproduction.

Thus, a main advantage of the present invention is that the amount of remaining data in the memory is sufficient at the time of cancellation of pause state because the succeeding read out from a compressed data memory is stopped when a pause state is set during reproduction operation to maintain at least the remaining amount of data at that time, and therefore the possibility is reduced of the remaining amount of data in the compressed data memory becoming zero so that the reproduced sound is made discontinuous, even in the case where the reproduction head has trouble in accessing the track at the time of pause cancellation in a disc player.

Another advantage of the present invention is that the remaining amount of data is zero in the compressed data memory when canceling the pause state because all the stored data in the compressed data memory is read out to be recorded on the disc and the recording of audio data into the compressed data memory is stopped when a pause state is set during recording operation in a disc recorder, so that there is little possibility in the memory becoming full so that the recording audio is interrupted even when the recording head has trouble in accessing the track at the time of pause cancellation.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 2 schematically shows the conditions of the audio data in respective portions of the recorder shown in FIG. 1.

DESCRIPTION OF THE PREFERRED EMBODIMENTS

As described in the section of the description of the background art, a small size disc is proposed as a digital audio information recording medium that allows recording/reproduction of digital audio information by employing magneto-optical recording/reproduction principle. These proposed small size discs are used in a disc player of portable types or for vehicles, and audio information of 74 minutes in maximum can be recorded on one side of a disc of approximately 7 cm in diameter.

In such a small size disc, intermittent recording/reproduction of a digital audio signal is proposed for realizing recording of a long period. Briefly, intermittent recording/reproduction of a digital audio signal is to thin out (data-compress) a digital audio signal to approximately 1/5 for recording the same on a disc by magneto-optical recording principle in recording, and expanding the data reproduced from the disc by magneto-optical reproduction principle by 5 times for forming the original continuous digital audio signal. Such magneto-optical recording/reproduction principle is disclosed in IEEE Transactions on Consumer Electronics, Vol. 35, No. 3 "Multimedia Type Digital Audio Disc System" issued on August, 1989, by S. Murata et al., and in Applied Optics Vol. 25, No. 22 "Erasable Digital Audio Disc System" issued November, 1986, by Torazawa et al. Briefly stated, this principle is to heat a magnetic layer of a disc with a laser beam to magnetize the magnetic layer by a recording signal under that condition to store information in a disc.

Such a small size disc has a continuous spiral guide groove previously formed on the surface of the disc. An ADIP code (Address Time in Pregroove) indicating the absolute position of a recording track is multiplexed in advance in this guide groove. The ADIP code includes the absolute address and frame number. Multiplexing this ADIP code on a guide groove is carried out as follows. The ADIP code is FM-modulated, whereby a guide groove is formed by spatial-modulation in the width direction according to the modulation signal. By directing a laser beam onto thus formed guide groove, the modulation signal components are detected as a tracking error signal, whereby the detected signal is used as an index indicating the absolute address of the recording track at the time of recording and reproducing audio data.

Figure 1:
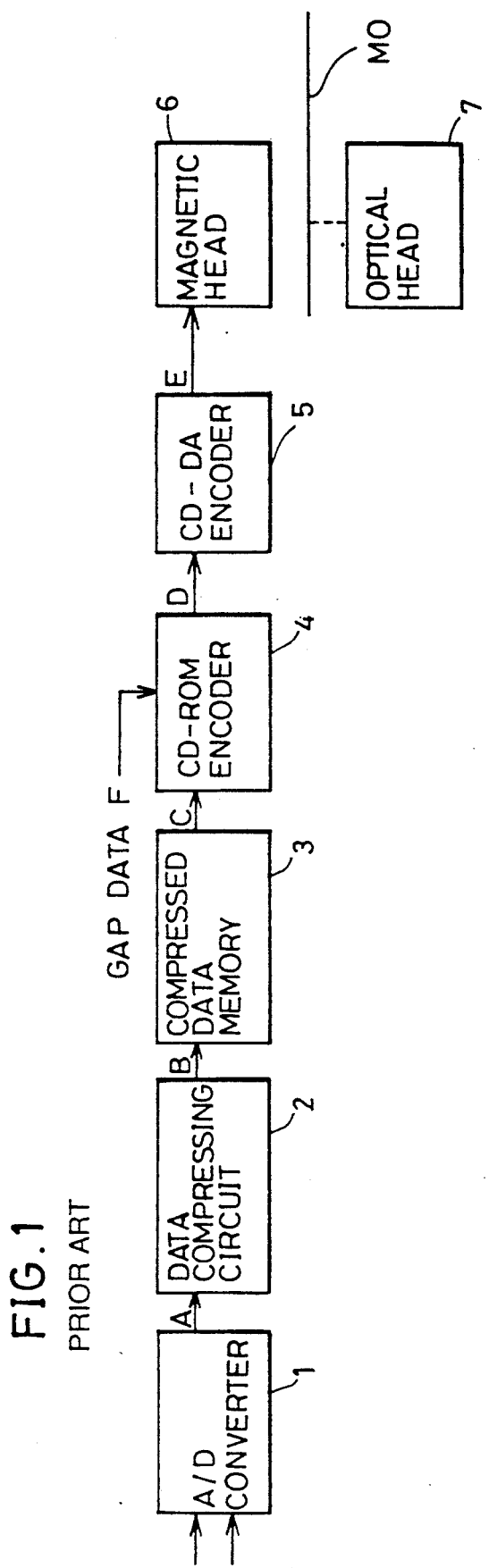
FIG. 1 schematically shows a structure of a recorder for a small size disc using the magneto-optical recording principle.

FIG. 1 schematically shows a structure of a recorder for a small size disc using such magneto-optical recording principle, and FIG. 2 schematically shows the conditions of audio data in respective portions of the recorder.

Referring to FIG. 1, a two-channel analog audio signal provided from an external audio signal source (not shown) is converted into digital audio data A having the bit number identical to that of the CD format (FIG. 2), at a clock frequency also identical to that of the recording format of CD, by an A/D converter 1. The digital audio data A is data-compressed to approximately 1/5 by the data compressing circuit 2 into a compressed audio data B, which is sequentially stored in the compressed data memory 3 at a low speed. When audio data corresponding to approximately two seconds (32 subcode frames, i.e. 32 sectors, of CD format, where 1 subcode frame is 1/75 seconds) which is one unit block of intermittent recording is stored in the compressed data memory 3, the recorder enters a write ready state, and an optical head 7 for reproduction searches the end of a recording track formed by an immediate previous recording operation according to the above-described ADIP code.

When the end of the immediately previously formed recording track is detected, the audio data of the above-described one unit block of record (32 sectors) is read out at high speed from the memory 3 to be provided to a CD-ROM encoder 4 as a time base compressed audio data C (FIG. 2). The CD-ROM encoder 4 applies synchronizing data to the audio data in every sector, and applies gap data for a predetermined time period before and after the audio data C to form intermittent data D (FIG. 2). This gap data is a blank data of no signals and serves to prevent audio data diffused by an interleaving process described afterwards from protruding out the blank data. The broken lines in intermittent data D in FIG. 2 indicate that the audio data is formed of a plurality (32) of sectors.

The intermittent data D is then provided to a CD-DA encoder 5 to have a sub-data identifying that sector applied and subjected to an interleaving process and an EFM modulation process to be provided to a magnetic head 6 as EFM data E (FIG. 2). This formed one unit of data E is implemented with 36 sectors including 32 sectors of audio data, 1 sector of a sub-data, and 3 sectors of gap data. This recording unit is referred to as one cluster hereinafter. The aforementioned encoders 4 and 5 have well known structures used as a recording device of a compact disc (CD), except for the application of gap data, and their detailed description will be omitted.

The magnetic layer of the recording position of a magneto-optical disc MO is heated by a laser beam directed to the back side of the disc MO from the optical head 7, whereby the magnetic layer in the guide groove is magnetized (magnetic field modulated) in response to the EFM data E by the magnetic head 6 under this condition to form a recording track of one cluster by the above-described magneto-optical recording principle. By repeating intermittently the formation of a recording track of one cluster, a spiral recording track as one continuous track is formed in the guide groove.

A read only disc is proposed having a recording format in common (compatible) with the above-described recording format of a small size disc, and having signals recorded by forming optical pits as in a conventional CD.

The recording of an audio signal to a read only disc is carried out by recording continuously an audio signal provided from a tape by a video cassette recorder, whereby a large number of read only discs can be duplicated based on thus manufactured original disc. The read only disc differs from the small size disc using the above described intermittent recording in that the data can be prevented from being destructed due to overlapped recording. Therefore, gap data for linking needed in intermittent recording such as in case of the above-described small disc is not necessary. As a result, the additional information of arbitrary contents can be recorded in the area corresponding to the storage area of three sectors for the gap data in each cluster. Such arbitrary data may include display data such as lyrics information recorded on the sub-data area of a conventional CD (CD graphic) and still picture data that changes according to the contents of the audio data.

Figure 3:
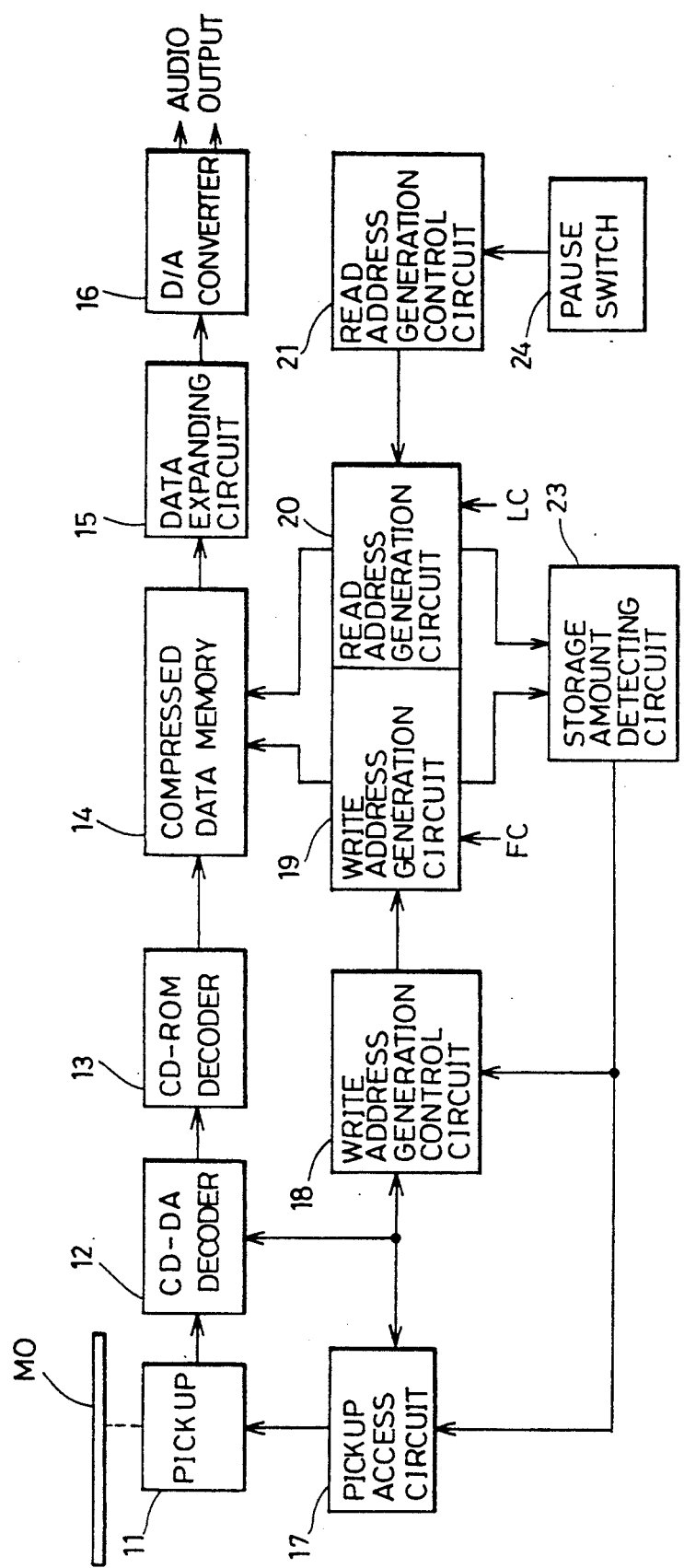
FIG. 3 is a block diagram schematically showing a disc player according to a first embodiment of the present invention.

FIG. 3 is a block diagram schematically showing a read only disc player according to a first embodiment of the present invention. The above-described read and write disc employs the magneto-optical recording system, and the above-described read only disc employs the optical recording system. Although these two types of discs differ from each other in the recording principle, the recording format are substantially in common. Therefore, by switching the reproduction method of the pickup in the disc player which will be described hereinafter, reproduction of both types of discs is possible.

Referring to FIG. 3, it is assumed that EFM data E (FIG. 2) having a recording unit of one cluster formed of 32 sectors of compressed audio data, 1 sector of a sub-data, and 3 sectors of gap data is stored intermittently on a magneto-optical disc MO. It is assumed that the reproduction method of the pickup 11 of the disc player of FIG. 3 is switched to the magneto-optical system when reproducing data from such a magneto-optical disc MO.

In reproducing EFM data intermittently recorded on the disc MO, the pickup 11 is driven by a pickup access circuit 17 on a sector basis to read out EFM data. The EFM data read out by the pickup 11 is first supplied to the CD-DA decoder 12, which is opposite to the case of recording shown in FIG. 1. The CD-DA decoder 12 applies a predetermined processings such as EFM demodulation and deinterleave process to the applied reproduced data to provide the same to the CD-ROM decoder 13.

The CD-ROM decoder 13 removes synchronizing components in the entered data, and the reproduced data with the time base being compressed state is supplied at high speed to the compressed data memory 14. The applied compressed data is stored in the compressed data memory 14 in accordance with a write address generated from a write address generating circuit 19. The compressed data memory 14 has a capacity that can store data equivalent to 54 sectors in maximum, for example.

In accordance with a subcode detected by the CD-DA decoder 12, the write address generation control circuit 18 controls the generation of a write address by the write address generating circuit 19. The subcode detected by the CD-DA decoder 12 is also applied to the pickup access circuit 17, whereby the access of the pickup 11 is carried out on a sector basis as described above, i.e. on a subcode frame basis.

The compressed data stored in the compressed data memory 14 is read out continuously at a low speed in accordance with a read out address generated from the read out address generating circuit 20 by counting a clock LC of low rate. By such a read out, the amount of remaining data in the compressed data memory 14 is reduced. The storage amount detecting circuit 23 calculates the difference between the write address generated from the write address generating circuit 19 and the read out address generated from the read out address generating circuit 20 to detect the amount of remaining data in the compressed data memory 14. When the amount of data in the compressed data memory 14 is reduced at least by two sectors from the full state of 54 sectors to generate an empty area, the storage amount detecting circuit 23 generates a reproduction instruction output to provide the same to the pickup access circuit 17 and the write address generation control circuit 18 to carry out supply of data to the compressed data memory 14.

More specifically, the pickup access circuit 17 responds to the reproduction instruction output to update the subcode which becomes the target of access, whereby data of a new sector is reproduced by the pickup 11. During the time period where the reproduction instruction output is entered, the write address generation control circuit 18 continues the generation of a write address signal from the write address generation circuit 19 when a subcode of a sector not-recorded including an audio signal is detected, whereby storage of reproduced compressed audio data in a sector unit is carried out. When the empty area of the compressed data memory 14 becomes less than two sectors, the storage amount detecting circuit 23 stops the generation of the reproduction instruction output. Thus, compressed audio data will be stored in the compressed data memory 14 without creating a large empty area. The threshold value of the capacity of the empty area for generating a reproduction instruction output from the storage amount detecting circuit 23 is not limited to the above-described two sectors, and an arbitrary data amount can be set that is more than two sectors. However, it is considered most preferable to set the threshold value to two sectors in the current state from the standpoint of control and administration of data.

The compressed audio data read out continuously at a low speed from the compressed data memory 14 is applied to the data expanding circuit 15. The data expanding circuit 15 restores the reproduced compressed data to its original state to provide the same to the D/A converter 16. The D/A converter 16 converts the digital audio signal into an analog audio signal of two channels to output the same.

A pause switch 24 for setting a pause state during reproduction operation is provided in the disc player of FIG. 3. When a user operates the switch 24 to set a reproduction pause state during reproduction operation, the read out address generation control circuit 21 controls the read out address generating circuit 20 to stop generation or update of a read out address. Therefore, read out of compressed audio data from the compressed data memory 14 is stopped, which in turn stops the data expanding operation by the data expanding circuit 15 and the D/A conversion by the D/A converter 16, so that generation of an audio signal from the disc player is prevented.

As a result, the compressed data memory 14 enters a read out standby state while storing a great amount of compressed audio data. The pickup access circuit 17 also enters a reproduction standby state when the reproduction instruction output from the storage amount detecting circuit 23 is stopped. In order to save energy most effectively, the supply of power to the motor (not shown) for rotating the disc may be disconnected at the time of pause setting.

When the user operates the pause switch 24 to cancel the reproduction pause state, the read out address generation control circuit 21 controls the read out address generating circuit 20 to cancel the interruption of the generation or update of a read out address. In response to such cancellation, the continuous read out of data at a low speed from the compressed data memory 14 is restarted, whereby a reproduced audio signal is generated by the data expanding operation by the data expanding circuit 15 and the D/A conversion operation by the D/A converter 16. As described above, the drive of the motor is restarted simultaneous with the cancellation of the pause state when the rotation of the motor for disc rotation has been stopped.

Thus, when read out of data from the compressed data memory 14 is restarted, the empty area in the compressed data memory 14 increases, whereby the storage amount detecting circuit 23 generates a reproduction instruction signal that is provided to the pickup access circuit 17 and the write address generation control circuit 18. As a result, the pickup access circuit 17 drives the pickup 11 to access a new sector to supply data to the compressed data memory 14.

Figure 4:
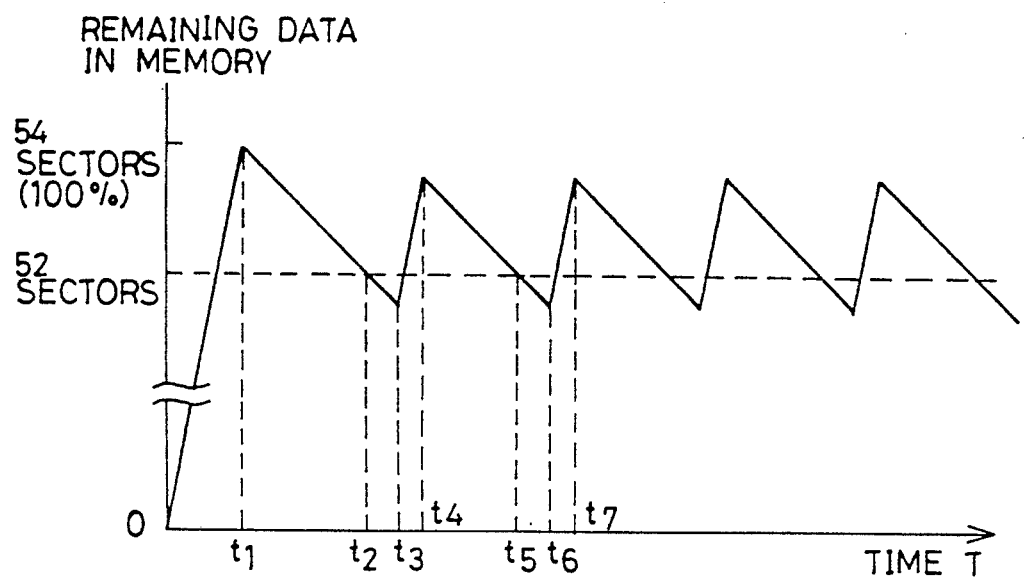
FIGS. 4-6 are timing charts for describing the operation of the disc player according to the first embodiment of FIG. 3.
Figure 5:
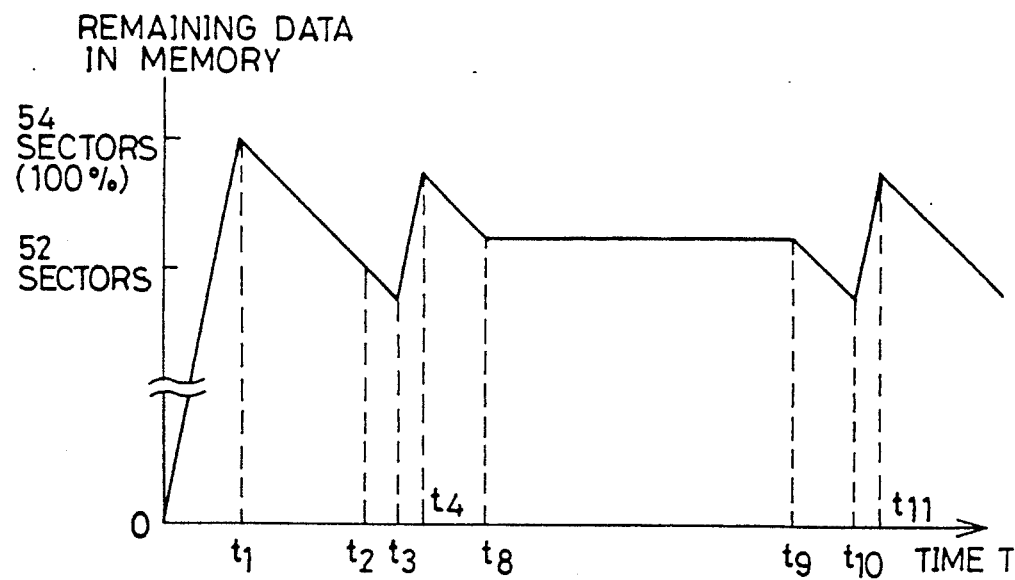
Figure 6:
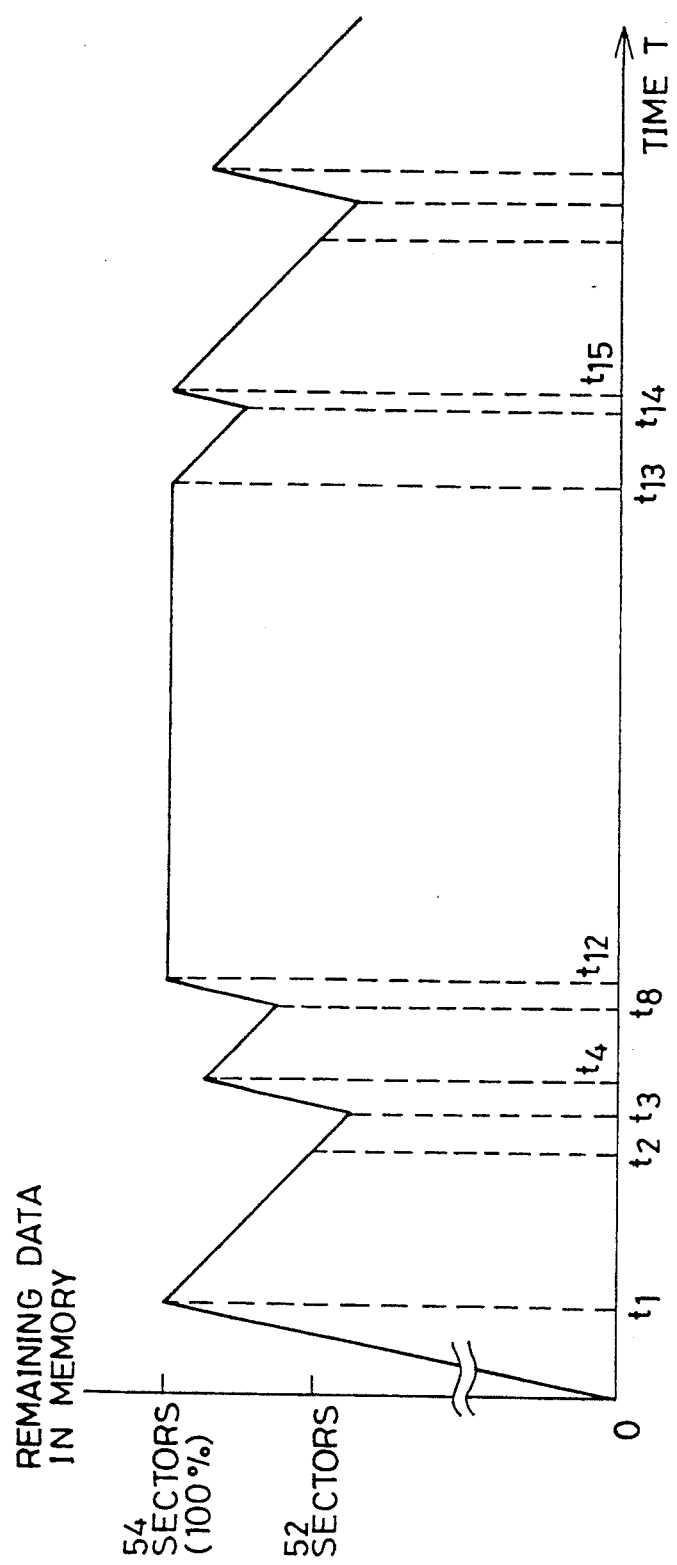

FIGS. 4-6 are timing charts for describing the operation of the disc player according to the first embodiment shown in FIG. 3. FIG. 4 shows the state of the remaining data in the compressed data memory 14 of FIG. 3 in accordance with time transition in case of normal reproduction operation. At the time of normal reproduction operation, the compressed data read out from the disc MO is written into the compressed data memory 14 at high speed. At time t1, the memory 14 having a capacity of 54 sectors becomes full. From this time point, read out at a low speed from the compressed data memory 14 is initiated.

To ensure a remaining amount of data in the compressed data memory 14 as described above, the capacity of the empty area of the memory 14 is detected by the storage amount detecting circuit 23. When a predetermined threshold value, i.e. at least two sectors in the present embodiment, is achieved (time t2), the storage amount detecting circuit 23 generates a reproduction instruction output that is provided to the pickup access circuit 17. In response to this output, after a seeking time period (t3–t2) necessary for accessing the next sector, the pickup 11 reads out the compressed data of the subsequent sector that is provided to the compressed data memory 14. Thus, writing of data of two sectors to the memory 14 is carried out during time period from t3 to time t4. This operation is repeated thereafter. As described above, at the time of normal reproduction operation, data stored in the magneto-optical disc MO is accessed on two-sector basis to be stored intermittently in compressed data memory 14. The read out from the compressed data memory 14 is carried out continuously at a constant low speed.

FIG. 5 shows the state of the remaining amount of data in compressed data memory 14 in accordance with time transition in a case where a pause state is set during reproduction operation. When a user operates the pause switch 24 at time t8 during reproduction operation, the read out address generation control circuit 21 responsively blocks the clock LC entered into the read out address generating circuit 20, whereby the count operation by the read out address generating circuit 20 is ceased to stop data read out from the compressed data memory 14. As a result, the compressed data memory 14 enters a read out standby state while maintaining the remaining amount of data in the compressed data memory 14 at the time point of t8.

When the pause state is canceled by the user operating the pause switch 24 (time t9), the read out address generation control circuit 21 controls the read out address generating circuit 20 to cancel the interruption of a read out address generation, whereby the data read out operation from the compressed data memory 14 is initiated again. Then, the compressed data memory 14 is restored to the normal reproduction operation.

According to the above-described first embodiment of the present invention, the remaining amount of data in the memory at the time of pause state cancellation is sufficient because succeeding read out from the compressed data memory 14 is stopped to maintain the remaining amount of data at the time when the pause state was set during reproduction operation, so that the possibility is reduced of the remaining amount of data in the memory 14 becoming zero to intermit the reproduced sound even when the pickup 11 has trouble in accessing the track at the time of pause cancellation.

Although the embodiment shown in FIG. 5 has the remaining amount of data in the compressed data memory 14 at the time of setting of a pause state during reproduction operation maintained without changing, it is possible to further write data into an empty area in the compressed data memory 14 at the time of setting of pause. FIG. 6 is a timing chart for describing such an operation which is a modification of the first embodiment.

In FIG. 6, the operation from time 0 to time t8 is identical to that of FIG. 5. When a pause state is set at time t8, the read out address generation control circuit 21 stops data read out from the compressed data memory 14, and the write address generation control circuit 18 initiates the count up operation of a clock FC by the write address generating circuit 19. The write address generation control circuit 18 responds to a detected output of the storage amount detecting circuit 23 to continue the count up operation of the write address generating circuit 19 until there is no empty area in the compressed data memory 14.

When detection is made by the storage amount detecting circuit 23 of elimination of the empty area in the compressed data memory 14 (time t12), the write address generation control circuit 18 blocks the clock FC entered into the write address generating circuit 19 to cease the count up operation by the write address generating circuit 19, whereby the writing operation of compressed data into the compressed data memory 14 is stopped. Here, the write address generation control circuit 18 holds the last address of the data read out from the disc MO.

When a pause state is canceled by the user (time t13), the read out address generating circuit 20 responds to a reproduction permission signal generated from the read out address generation control circuit 21 to restart the count up operation from the address held therein, whereby the read out operation of compressed data from the compressed data memory 14 is reinitiated. The storage amount detecting circuit 23 makes determination whether data writing of two sectors is completed during time period from t8 right after the pause setting to t12. When determination is made that data writing of two sectors has not yet completed, the writing of the remaining data of the sector which was written during time t8 to time t12 is carried out during time t14 to time t15. During this time period, the write address generating circuit 19 carries out the count up operation in accordance with the remaining amount of data in the memory 14 detected by the storage amount detecting circuit 23. When an empty area is eliminated from the memory 14, the write address generation control circuit 18 stops the count up operation of the write address generating circuit 19 to interrupt the writing of data into the compressed data memory 14 (time t15). The succeeding operation is identical to that of the normal reproduction operation shown in FIG. 4.

According to the modification shown in FIG. 6, the remaining amount of data in the memory at the time of pause cancellation becomes more sufficient because the succeeding read out operation from the compressed data memory 14 is stopped and the empty area is filled with newly read out data when a pause state is set during reproduction operation, so that the possibility of reproduced sound being made discontinuous at the time of pause setting is further reduced.

Also, the power energy can further be saved because motor actuation can be carried out during the read out of data stored in the compressed data memory 14 at the time of pause cancellation when the drive of the disc rotation motor has been stopped at the time of setting of reproduction pause.

Because the above-described storage amount detecting circuit 23 detects the difference between the address specified by the write address generating circuit 19 and the address specified by the read out address generating circuit 20 in order to detect the remaining amount of data stored in the compressed data memory 14, the empty area may be detected directly from the compressed data memory 14, or the input and output data amounts of the compressed data memory 14 may be counted by a separate counter.

Although the above-described embodiments have the reproduction and recording of data from and into the memory 14 carried out on two-sector basis, the present invention can be applied to a disc player where one cluster is the unit of data reproduction by modifying the format of signal processing from sector basis to cluster basis.

Figure 7:
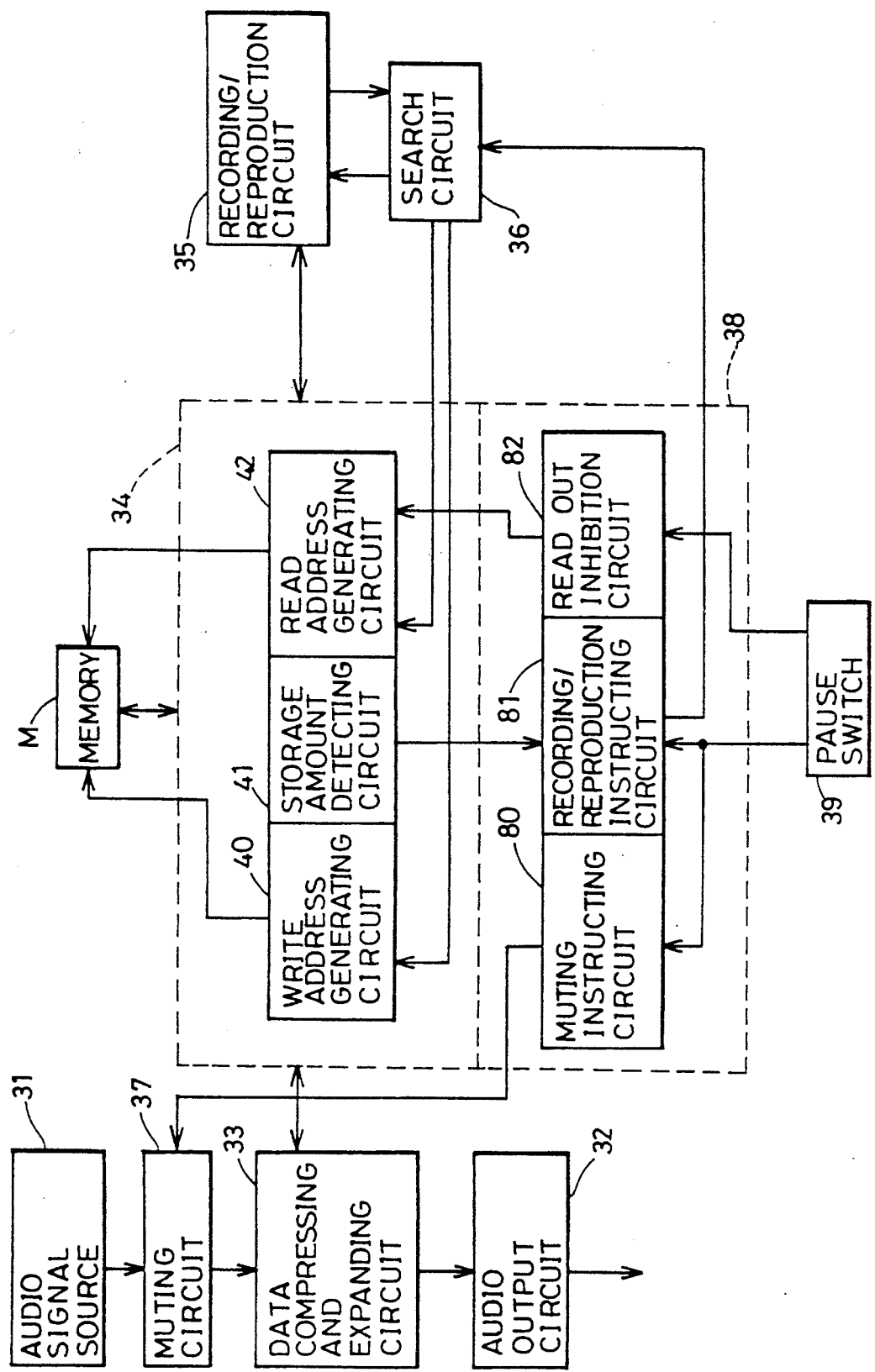
FIG. 7 is a block diagram schematically showing a disc recorder according to a second embodiment of the present invention.

FIG. 7 is a block diagram schematically showing a disc recorder that is capable of recording and reproduction according to a second embodiment of the present invention. The disc recorder according to the present embodiment is proposed for usage for a small size disc for recording and reproduction using the aforementioned magneto-optical recording principle.

The structure of the embodiment shown in FIG. 7 will be described hereinafter. At the time of recording, a digital input audio data is provided from the audio signal source 31 which is sampled at a frequency identical to the sampling frequency in the recording format of the CD. The digital audio data is supplied to a data compressing and expanding circuit 33 via a muting circuit 37 which will be described afterwards. The digital audio data is data-compressed into approximately 1/5 by the data compressing and expanding circuit 33 to be provided to the data writing/reading circuit 34 as compressed audio data of a sector unit.

The data writing/reading circuit 34 generates a write address from the write address generating circuit 40 in synchronization with an input of compressed audio data, whereby the compressed audio data is written into the compressed data memory M on a sound group basis (424 bytes) which is smaller than sector basis in accordance with the write address. The data read out operation from the memory M is controlled by the read out address generating circuit 42. The storage amount detecting circuit 41 detects the difference between the write address of the write address generating circuit 40 and the read out address of the read out address generating circuit 42 as the stored data amount of memory M to provide the same to a recording/reproduction instructing circuit 81 which is implemented in a software manner by a microcomputer 38 for system control.

When the storage data amount in memory M detected by the storage amount detecting circuit 41 attains substantially one cluster, the recording/reproduction instructing circuit 81 generates a recording instruction output to the search circuit 36. In accordance with an ADIP code (Absolute Address) detected as the tracking signal components from the track of the disc by a reproduction head not shown, the search circuit 36 searches the end of the recording track formed by an immediate prior recording operation. The search circuit 36 also generates and provide to the recording/reproduction circuit 35 a track jump pulse for setting the pickup in a standby state at the absolute address of the beginning of the recording track succeeding the detected end. The search circuit 36 generates and provides to the read out address generating circuit 42 a data reading instruction output when the beginning of a new recording track is detected. In response to this output, the read out address generating circuit 42 generates and provides to the memory M a read out address for the purpose of reading out compressed audio data of one cluster from the memory M.

The compressed audio data of one cluster read out from the memory M is provided to the recording/reproduction circuit 35 to be subjected to a predetermined signal process by a CIRC encoder and an EFM encoder not shown, and then supplied to a recording head not shown to be recorded on a magneto-optical disc not shown by the magneto-optical recording principle. At the time of normal recording, such operation is repeated, whereby compressed audio data for each cluster is recorded intermittently.

At the time of reproduction, compressed audio data in sector unit sequentially reproduced by a reproduction head (not shown) from a recording track of a disc (not shown) is supplied to the recording/reproduction circuit 35 to be subjected to predetermined signal processings by an EFM decoder and a CIRC decoder not shown. Then, the reproduced compressed audio data is supplied to the data writing/reading circuit 34, whereby a write address is generated from the write address generating circuit 40 in synchronization with an input of the reproduced audio data. The reproduced audio data is written into the compressed data memory M in sector unit in accordance with the write address.

The compressed audio data stored in the memory M is read out in sector unit in accordance with a read out address generated from the read out address generating circuit 42 to be provided to the data compressing and expanding circuit 33. The storage amount detecting circuit 41 detects the storage data in the memory M to supply the detected output to the recording/reproduction instructing circuit 81 of the microcomputer 38 also at the time of reproduction. The recording/reproduction instructing circuit 81 generates and provides to the search circuit 36 a reproduction instruction output when the capacity of the empty area in the memory M exceeds two sectors. During the generation of the reproduction instruction output, the search circuit 36 drives the recording/reproduction circuit 35 to sequentially reproduce data in the recording track, and causes a write address to be continuously generated from the write address generating circuit 40 to write into the memory M the reproduced compressed audio data.

When the storage data amount in memory M approximates a full state and the capacity of the empty area becomes less than two sectors, the reproduction instruction from the recording/reproduction instruction circuit 81 is canceled. In response to this cancellation, the search circuit 36 stores the address of the end of the recording track at this time point to set the pickup into a standby state. Also, the data write instruction is canceled, whereby the generation of a write address from the write address generating circuit 40 is stopped. Then, after the empty area is increased as a result of data read out from the memory M, the above-described intermittent reproduction is repeated.

The compressed audio data read out from the compressed data memory M is supplied to the data compressing and expanding circuit 33 to be data-expanded by 5 times. The expanded audio data is converted into an analog signal by the audio output circuit 32 to be externally provided.

The data compressing and expanding circuit 33 has its operation switched by a mode to carry out data compressing operation at the time of recording mode and to carry out data expanding operation at the time of reproduction mode. The EFM encoder and the CIRC encoder and the ESM decoder and the CIRC decoder, constituting the recording/reproduction circuit 35, are used as common circuits.

The operation in reproduction mode of the disc decoder of FIG. 7 is basically identical to that of the read only disc player shown in FIG. 3.

The embodiment of FIG. 7 has a pause switch 39 provided for setting/canceling a pause state during recording/reproduction operation. When the switch 39 is operated to set a recording pause state during recording operation, a recording pause instruction output from the pause switch 39 is supplied to the muting instructing circuit 80 and the recording/reproduction instructing circuit 81 constituted by the system controller 38. The muting instructing circuit 80 responds to a recording pause instruction signal to immediately generate and provide to the muting circuit 37 a muting instruction output. The muting circuit 37 responds to the muting instruction output to restrict the input audio data to the level of 0 during the time period corresponding to one cluster (=36 sectors : 1 sector is 1/75 seconds).

Figure 8:
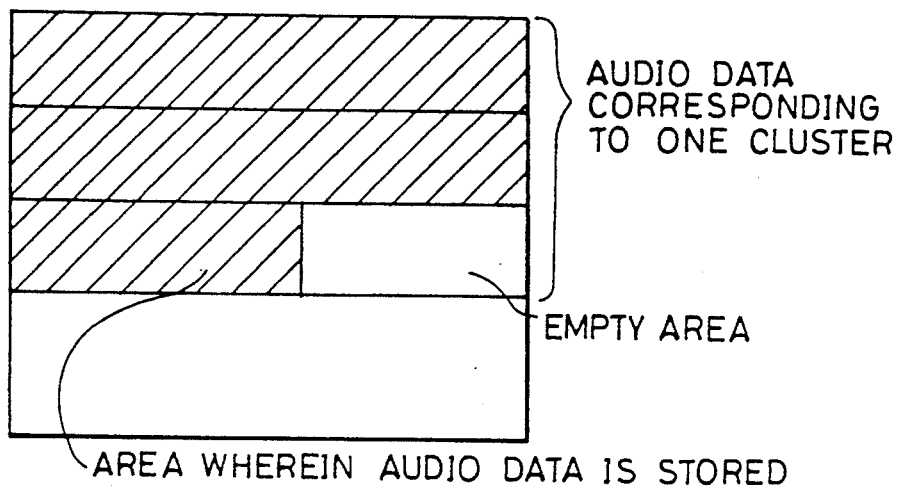
FIGS. 8 and 9 schematically show the operation principle of the second embodiment of the present invention.
Figure 9:
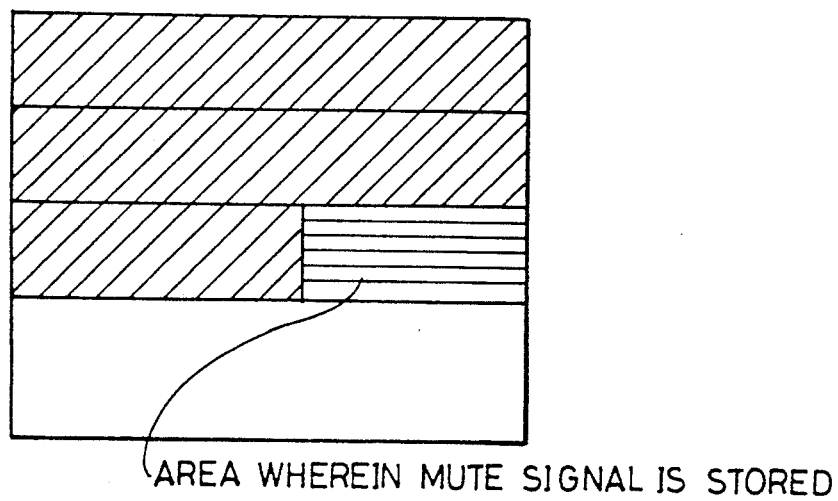

FIG. 8 schematically shows the data storage state of the compressed data memory M at the time of setting of a recording pause. FIG. 9 schematically shows the data storage state of the compressed data memory M according to an embodiment of the present invention. More specifically, when a recording pause is set in the case where data of one cluster is not fully stored in the memory M with the existence of an empty area as shown in FIG. 8, data compression of the above-described mute audio data of level 0 by the data compressing and expanding circuit 33 and writing the same into the compressed data memory M will fill the empty area with mute audio data to complete data of one cluster.

After input of a recording pause instruction from the pause switch 39, the recording/reproduction instructing circuit 81 restricts its generation to just one recording instruction output. As a result, one cluster of compressed audio data including mute audio data which was stored in the compressed data memory M (FIG. 9) is read out from the memory M to be written into a disc (not shown) via the recording/reproduction circuit 35 to result in an empty memory M. If such a recording pause state continues for more than a predetermined time period, the supply of power is stopped to the recording/reproduction circuit 35, the compressed data memory M, the data writing/reading circuit 34, the data compressing and expanding circuit 33, and the like.

If the user operates the pause switch 39 to cancel the recording pause state during such a situation, the supply of power to the above-mentioned portions is reinitiated to restart the recording operation. If the recording pause state is canceled prior to the stop of power supply, the address generating circuits 40 and 42 are both reset to initiate writing and reading of compressed audio data from the initial address.

Figure 10:
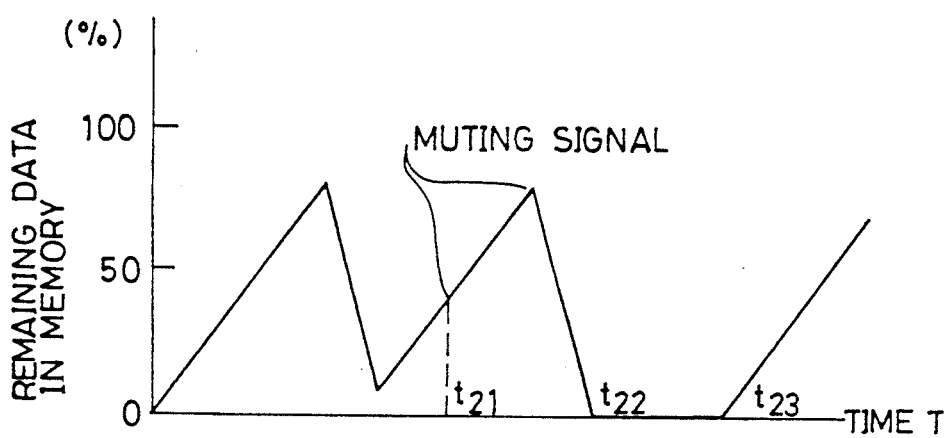
FIG. 10 is a timing chart for describing the operation of the second embodiment of the present invention shown in FIG. 7.

FIG. 10 shows the data storage amount of the compressed data memory M in accordance with time transition before and after setting of such a recording pause state. As described before, the operation of the compressed audio data being read out in one cluster unit to be provided to the recording/reproduction circuit 35 when the data storage amount of the memory M attains substantially one cluster is repeated, prior to the setting of a recording pause state. Then, when a user operates the pause switch 39 at time t21 during recording operation, the muting circuit 37 operates in response to this, whereby mute audio data is stored in the empty area of the memory M to complete data of one cluster in the memory M. The one cluster of audio data including mute audio data is read out from the memory M to be recorded on a disc. The writing operation of compressed audio data into the memory M is stopped after time t22 when the memory M becomes empty. After a predetermined time period elapses, the supply of power to each portion of the player is stopped as described above. Such a de-energization of power is effective for a portable type player.

When the user operates the pause switch 39 to cancel the pause state at time t23, the supply of the power to each portion of the player is reinitiated to restart writing operation of compressed audio data into the memory M. Because the address generating circuits 40 and 42 are both reset at the time of pause cancellation as described above, data writing is initiated from the state of zero of the storage amount of data in the memory M. The above described de-energization of power in the pause state is not necessarily needed if the power up response characteristics of the motor is not sufficient.

When there is an empty area in the memory M and one cluster of data is not formed at the time of setting a recording pause state, mute audio data is stored in the empty area to complete one cluster of data in the memory. However, such recording of mute audio data is not indispensable to the following embodiment as described hereinafter.

Figure 11:
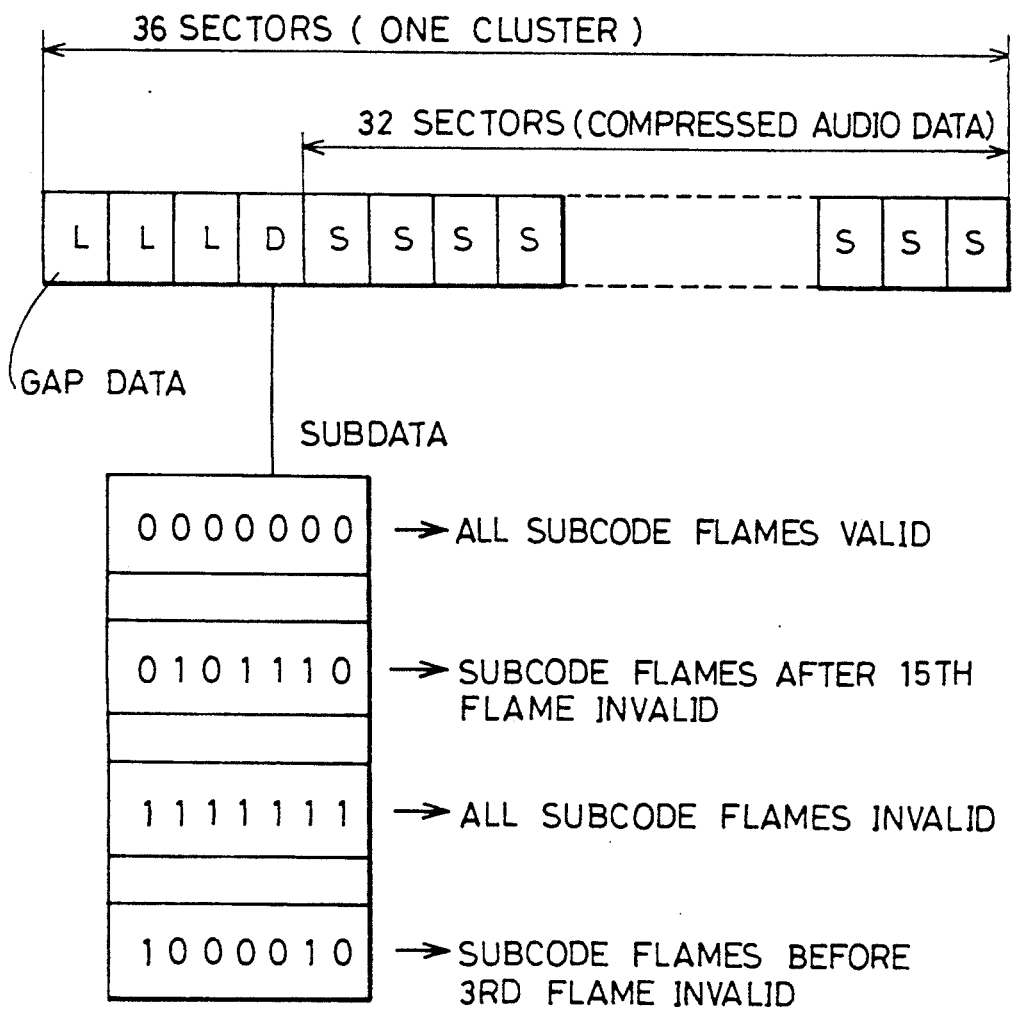
FIG. 11 schematically shows the data format of compressed audio data used in the second embodiment of the present invention.

FIG. 11 schematically shows a data structure of one cluster which is the recording unit to the disc. If there is an invalid sector in the audio data, the number thereof can be written as a sub-data D. For example, if the most significant 2 bits of the sub-data D is "01", it indicates that the latter half of data is invalid, and if it is "10", it indicates that the former half of data is invalid. The least significant 5 bits indicate the beginning or end of the sector number of the invalid sector. By controlling the reproduction system to carry out reproduction taking into consideration the existence of such an invalid sector during reproduction, there will be no problem even if audio mute data is not recorded. In the example shown in FIG. 11, if the most significant 2 bits of the control sub-data is "00", it indicates that all the sectors are valid, and if it is "11", it indicates that all the sectors are invalid.

According to the second embodiment of the present invention, all the stored data in the memory M is read out to be recorded on a disc and subsequent recording of audio data into the memory M is stopped when a pause state is set during recording operation, so that the remaining amount of data in the memory is zero at the time of pause state cancellation. There is a low possibility of the memory becoming full with the compressed audio data for recording to result in an discontinuous recorded sound even when the pickup has trouble in accessing a track at the time of pause cancellation.

Figure 12:
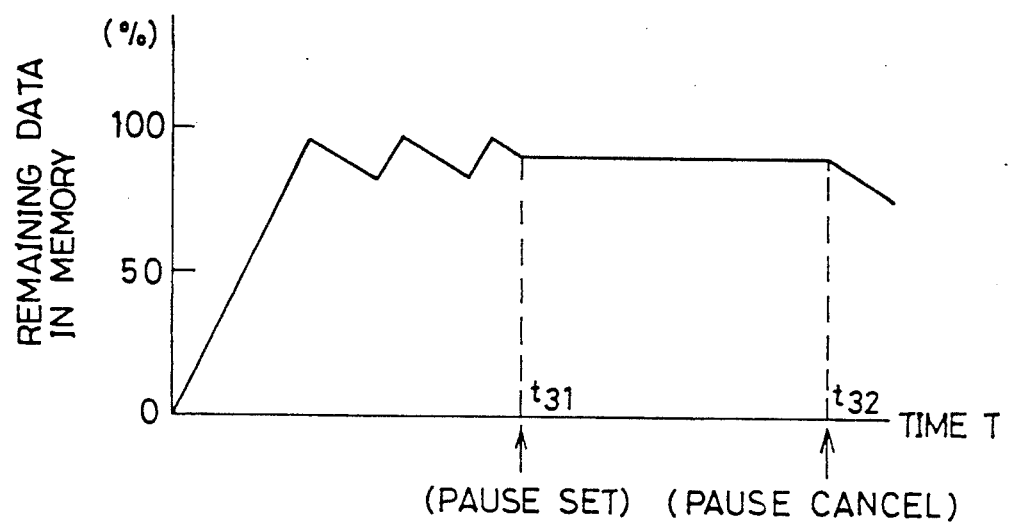
FIGS. 12 and 13 are timing charts for describing the operation at the time of reproduction in the embodiment of FIG. 7.
Figure 13:
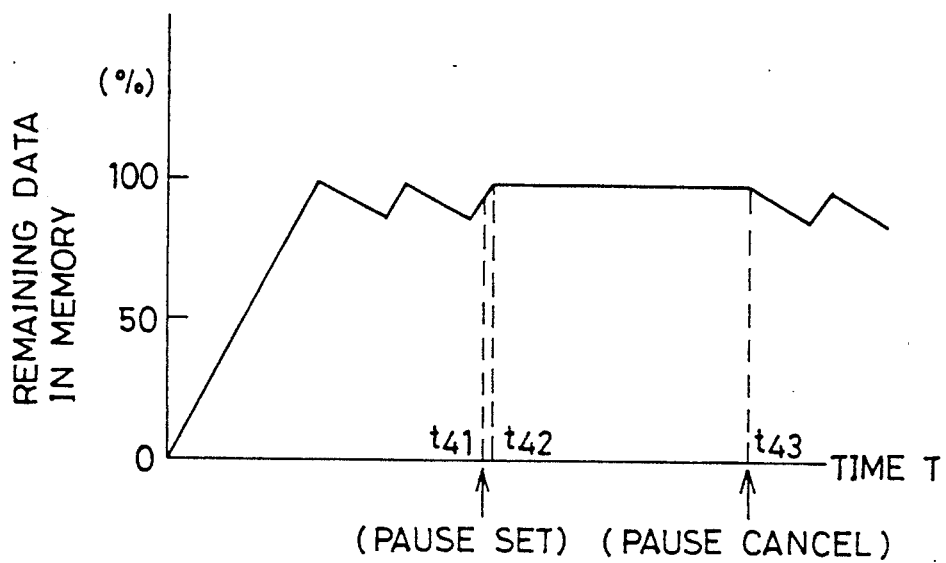

FIGS. 12 and 13 show the transition of data storage amount of compressed data memory M when a pause state is set during reproduction operation in the disc recorder of FIG. 7. Because the operation of this case is basically identical to the reproduction operation of the disc player of the first embodiment described with reference to FIGS. 3–6, detailed description thereof will not be repeated. The operation shown in FIGS. 12 and 13 is characterized in that the stored contents of the memory M at the time of pause setting is maintained during the pause term by the read out inhibition instructing circuit 82 as in the case of FIG. 5 when a reproduction pause state is set during reading out data from the compressed data memory M into the data compressing and expanding circuit 33 (FIG. 12), and that the memory M is made full with compressed audio data to maintain the stored data thereof as in the case of the embodiment of FIG. 6 when a reproduction pause state is set during writing data into the memory M (FIG. 13).

Although the mute instructing circuit, the recording-/reproduction instructing circuit, and the reading inhibition instructing circuit are implemented in a software manner by a microcomputer for system control in the above-described second embodiment, these circuits can be implemented in a hardware manner.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A reproduction device for reproducing compressed audio data recorded upon a disc, comprising:
   reproduction means for reproducing said compressed audio data from said disc as audio data,
   memory means for holding said audio data,
   write control means for writing intermittently into said memory means said audio data reproduced by said reproduction means,
   read out control means for continuously reading out said audio data from said memory means,
   means for converting said audio data read out from said memory means into an audio signal,
   intermittent reproduction control means, connected to said reproduction means and said write control means, for supplying said reproduced audio data into said memory means when detection is made of an empty area exceeding a predetermined amount in said memory means,
   pause setting and canceling means for setting and canceling a reproduction pause state of said reproduction means, and
   read out restricting means, responsive to a setting of said reproduction pause state by said pause setting and canceling means, for stopping read out of said audio data from said memory means.

2. The disc reproduction device according to claim 1, wherein said read out restricting means comprises means for maintaining data stored in said memory means at the time of setting of said reproduction pause state by said pause setting and canceling means.

3. The disc reproduction device according to claim 2, wherein said read out restricting means comprises means for restarting read out of said audio data from said memory means in response to a cancellation of said reproduction pause state by said pause setting and canceling means.

4. The disc reproduction device according to claim 1, wherein said intermittent reproduction means comprises means for carrying out supply of said reproduced audio data into said memory means after stopping of read out of said audio data from said memory means by said read out restricting means.

5. The disc reproduction device according to claim 4, wherein said read out restricting means comprises means for restarting read out of said audio data from said memory means in response to a cancellation of a reproduction pause state by said pause setting and canceling means.

6. A recording device for writing compressed data into a disc, comprising:
   data compressing means for data-compressing audio data provided from an audio signal source,
   memory means for holding said compressed audio data,
   write control means for sequentially writing into said memory means said audio data compressed by said data compressing means,
   read out control means for reading out, in a predetermined recording unit, said audio data as compressed data from said memory means,
   recording means for recording said compressed audio data read out from said memory means into said disc,
   intermittent recording control means, connected to said read out control means and said recording means, for reading out said audio data from said memory means to said recording means for recording, when detection is made of storage of audio data exceeding said predetermined recording unit in said memory means,
   pause setting and canceling means for setting and canceling a recording pause state of said recording means, and
   write restricting means for reading out into said recording means said audio data of said predetermined recording unit being recorded at the time of setting of said recording pause state and for stopping writing audio data of a succeeding predetermined recording unit into said memory means, in response to a setting of said recording pause state by said pause setting and canceling means.

7. The disc recording device according to claim 6, further comprising
   mute means for muting audio data supplied from said audio signal source in response to a setting of said recording pause state by said pause setting and canceling means,
   wherein said write restricting means comprises means for filling with mute audio data an empty area of said predetermined recording unit which was being recorded at the time of setting of said recording pause state and then reading out said recording unit into said predetermined recording means.

8. The disc recording device according to claim 6, wherein said write restricting means comprises means for restarting writing of said audio data into said memory means in response to a cancellation of said recording pause state by said pause setting and canceling means.

9. A recording/reproduction device for recording and reproducing compressed audio data into and from a disc, comprising:
   recording/reproduction means for recording said compressed audio data into said disc and for reproducing said compressed audio data from said disc,
   means for compressing audio data for recording at the time of recording and for expanding said audio data reproduced at the time of reproduction,
   memory means for holding said audio data,
   writing control means for sequentially writing into said memory means said audio data which is data-compressed at the time of recording and for writing intermittently said audio data reproduced by said reproduction means into said memory means at the time of reproduction, read out control means for reading out said audio data as compressed data in a predetermined recording unit from said memory means at the time of recording and for continuously reading out said audio data from said memory means at the time of reproduction, intermittent recording control means, connected to said read out control means and said recording/reproduction means, for reading out said audio data from said memory means into said recording/reproduction means for recording, when detection is made of stored audio data exceeding said predetermined recording unit in said memory means at the time of recording, intermittent reproduction control means, connected to said recording/reproduction means and said write control means, for supplying said reproduced audio data into said memory means, when detection is made of an empty area exceeding a predetermined amount of said memory means at the time of reproduction, pause setting and canceling means for setting and canceling a recording or reproduction pause state of said recording/reproduction means, write restricting means for reading out said audio data of said predetermined recording unit being recorded at the time of setting of said recording pause state into said recording/reproduction means and for stopping writing of audio data of a succeeding predetermined recording unit into said memory means, in response to a setting of said recording pause state by said pause setting and canceling means, and readout restricting means for stopping read out of said audio data from said memory means in response to a setting of said reproduction pause state by said pause setting and canceling means at the time of reproduction.

* * * * *